Feb. 17, 1925.
W. C. STEWART
COUNTER MOLDING MACHINE
Filed Sept. 30, 1921
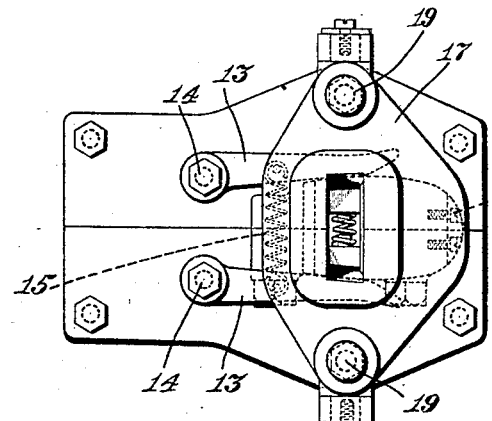
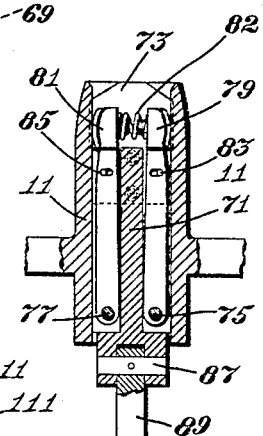
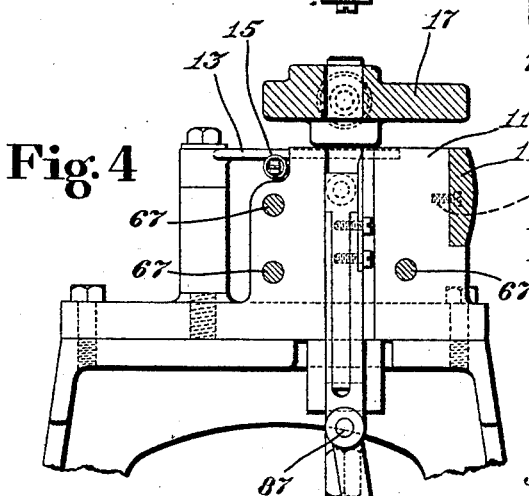
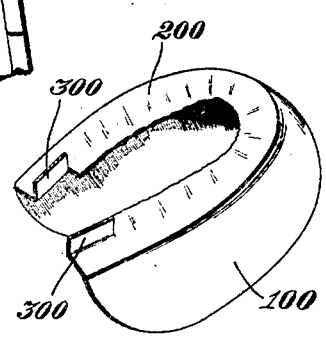
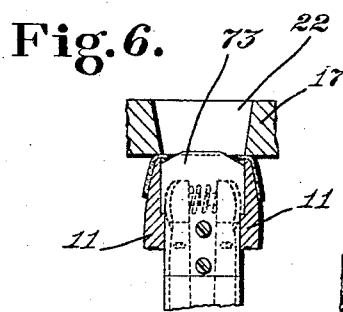
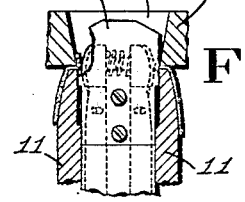
INVENTOR
William C. Stewart
By his Attorney
Nelson W. Howard Patented Feb. 17, 1925.

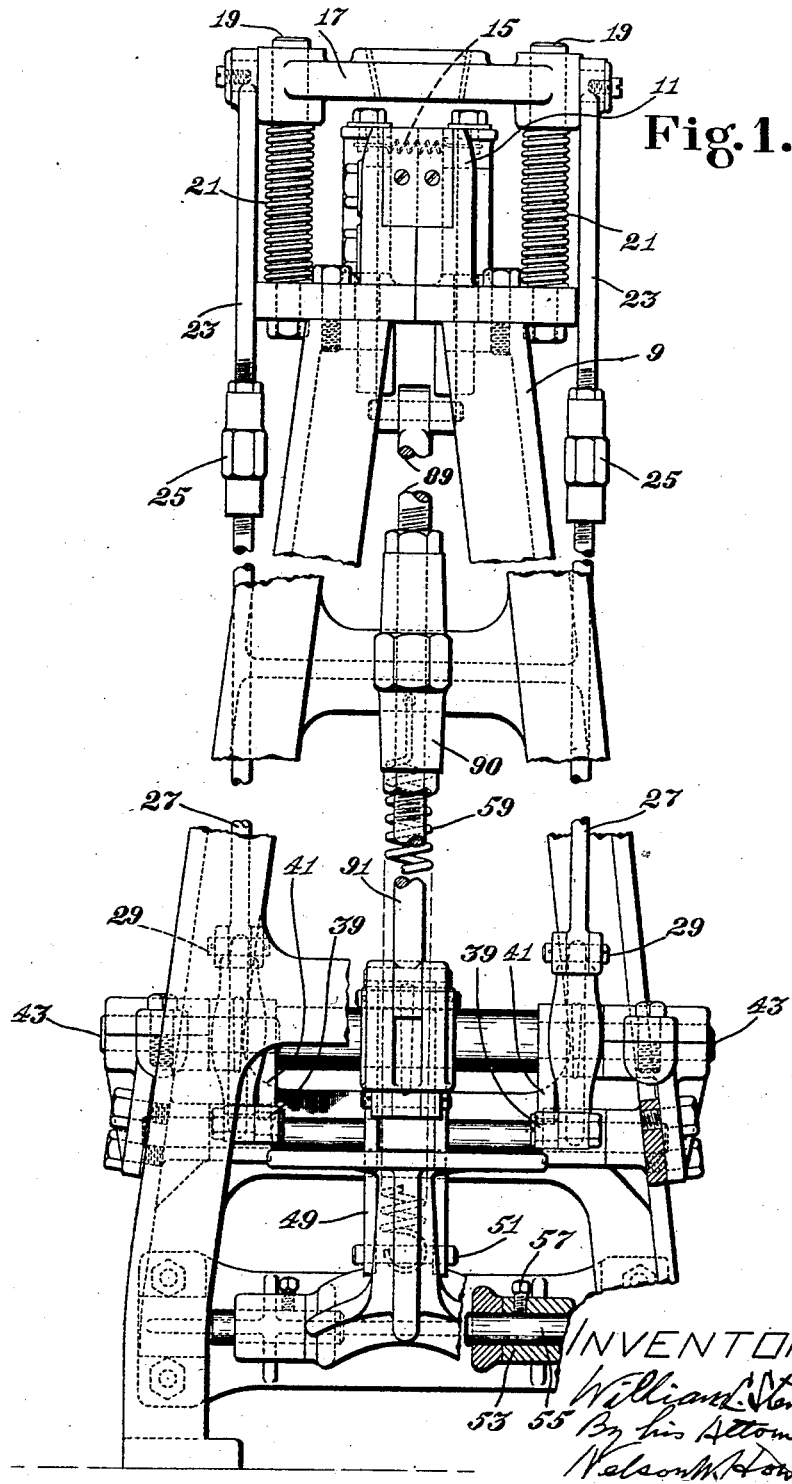

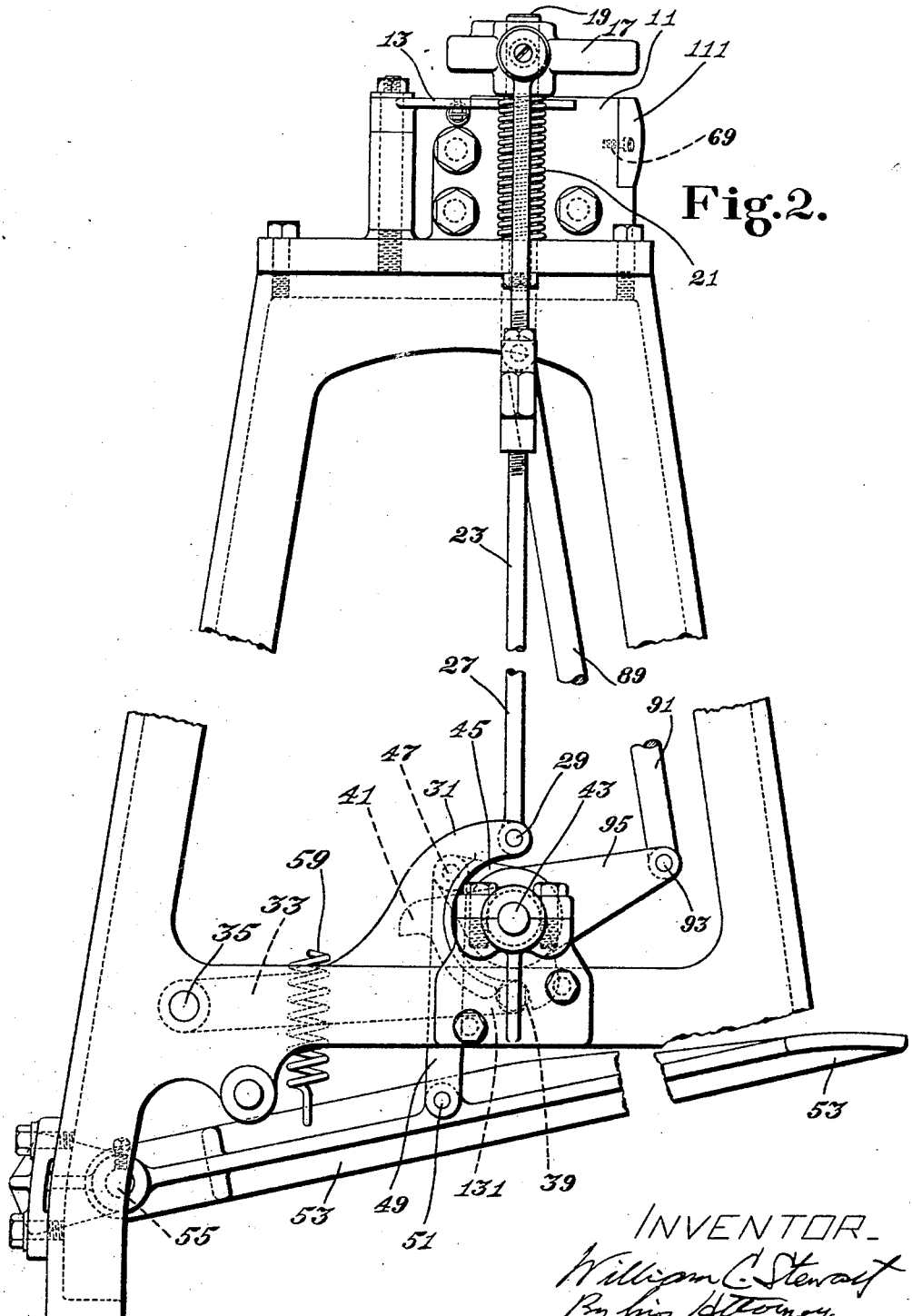

1,526,614

UNITED STATES PATENT OFFICE.

WILLIAM C. STEWART, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY.

COUNTER-MOLDING MACHINE.

Application filed September 30, 1921. Serial No. 504,328.

*To all whom it may concern:*

Be it known that I, WILLIAM C. STEWART, a subject of the King of England, and resident of Swampscott, in the county of Essex and State of Massachusetts, have invented certain Improvements in Counter-Molding Machines, of which the following description, in connection with the accompanying drawings, is a specification, like reference characters on the drawings indicating like parts in the several figures.

This invention relates to molding machines and is herein illustrated as embodied in a machine for forming two lips at the forward ends of the inturned flange of a molded counter said lips being adapted to lie against the sides of the lip of the insole of the shoe in which such counter is to be incorporated.

The general object of the present invention is to simplify the construction and improve the operation of machines of this kind.

According to one feature of the invention, means are provided for bending these lips outwardly as well as upwardly so as to provide against the tendency of the material of which such counters are made to return to its original position after it has been bent. In the illustrative machine, the forward portions of the inturned flange of the counter are slit to produce tongues and these tongues are formed into lips by means of an expansible plunger which forces the tongues upwardly into a recess in a clamping member. The recess in the clamping member is somewhat wider than the guideway in which the plunger is normally held so that the plunger, when it is permitted to expand, presses the lips outwardly against the walls of the recess. The word "upwardly" is used herein for convenience since in the illustrative machine the counter is supported bottom side up; but it will be understood that in the finished shoe the lips of the counter flange extend downwardly.

These and other features of the invention, including certain details of construction and combinations of parts, will be described as embodied in an illustrative machine and pointed out in the appended claims.

Referring now to the accompanying drawings,—

Fig. 1 is a front elevation of a machine in which the present invention is embodied;

Fig. 2 is a side elevation of the machine;

Fig. 3 is a top plan view of a portion of the machine;

Fig. 4 is an elevation, partly in section, of the upper portion of the machine;

Fig. 5 is a cross section through the counter support showing more particularly the construction of the expansible plunger;

Figs. 6 and 7 are details, principally in section, showing two of the steps in the operation of the machine, and Fig. 8 is a perspective of a molded counter after it has been operated upon by the machine.

Referring first to Fig. 8, there is shown a molded counter 100 having the usual inturned flange 200 for engagement with the insole. Before the counter was operated upon by the machine, all portions of this inturned flange were located in one plane. In the manufacture of a welt shoe it is desirable to form two tongues at the forward portions of this flange and bend them upwardly to form the upstanding lips 300. In the manufacture of a welt shoe the counter is so placed that these lips 300 lie alongside the ends of the insole lip and are stitched to those ends. With this brief description of the article which is produced, the machine itself will now be described.

Fastened rigidly to the frame 9 of the machine is a counter support 11 upon which the counter is placed with the inturned flange resting upon the top of the support. In order to hold the counter in place preparatory to clamping the flange, two arms 13 are pivoted on studs 14 and are urged toward each other by a spring 15 so as to press the sides of the counter against the sides of the counter support. Mounted above the counter support is a clamping member in the form of a cross head 17 bored to receive stationary upright guide rods 19, the cross head being urged upwardly at all times by springs 21 which are coiled about the guide rods. This clamping member has a passageway or recess 22 which registers with a guideway in the counter support and has flaring sides (see Figs. 1, 6 and 7). The purpose of this recess or passageway will presently appear. Pivotally connected to the clamping member 17 are two rods 23 connected by turnbuckles 25 with rods 27 the lower ends of which are pivoted at 29 to the upper forks 31 of forked arms 33 which in turn are pivoted to the frame at 35, the lower forks 131 of the arms 33 carrying rolls 39 which are adapted to be engaged by cams 41 fast to a rockshaft 43. Also fast to the rockshaft is an arm 45 pivoted at 47 to the upper end of a link 49 the lower end of which is pivoted at 51 to a treadle 53, said treadle being fastened at one end to small rockshafts 55 by set screws 57. A spring 59 connected at its lower end to the treadle and at its upper end to the frame of the machine normally holds the treadle raised and the parts of the machine in the positions shown.

With this construction, when the treadle is depressed, the cams 41 are rocked in counter clockwise directions as viewed in Fig. 2, thereby acting upon the rolls 39 to swing the forked lever 33 downwardly and thereby to bring the clamp 17 down upon the inturned flange of the counter. Projections on the cams 41 limit the extent to which tht shaft 43 may be rocked, either when the treadle is depressed, as has just been described, or when the treadle is released and the spring 59 raises it. The cams 41 are so shaped that the clamp is brought down upon the flange of the counter during the first part of the downward movement of the treadle, there being dwells in the cams so as to hold the clamp down during the latter part of the downward movement of the treadle. During this latter part of the downward movement of the treadle the inturned flange of the counter is snipped and bent into the position shown in Fig. 8.

Referring now more particularly to Figs. 3 to 7, the counter support is made in two parts fastened together by transverse bolts 67 and a cross piece 111 which is fastened to the side pieces by screws 69, a vertical guideway being formed in the side pieces to receive a vertically sliding carrier 71. This carrier has fast to its upper end a snipping or slitting knife 73 and has pivoted to it near its lower end at 75 and 77 respectively, spreaders or benders 79, 81. A spring 82 urges the spreaders apart at all times, the extent to which they may be so spread being limited by pins 83, 85 mounted in the carrier and extending through slots in the spreaders. This whole unit constitutes in effect an expansible plunger which acts, in a manner presently to be described, to force the lips 300 of the counter up into the recess 22 of the clamp and press them outwardly against the walls of the recess. The walls of the recess 22 are inclined as shown so that the tongues or lips on the counter will flare outwardly to offset the tendency of the tongues to return to their original positions.

Pivoted at 87 to the lower end of the carrier 71 is the upper end of a link 89, the lower end of which is connected by turnbuckle 90 with the upper end of a link 91, the lower end of which is pivoted at 93 to an arm 95 which is rigid with the arm 45. Consequently, when the treadle 53 is depressed, the carrier 71 is moved upwardly. As has been stated, however, the parts are so arranged that the clamp 17 engages the flange of the counter before the carrier 71 has risen far enough to cause the knife 73 to engage the flange of the counter.

In the operation of the machine the counter is placed upon the support with its wings pressed against the sides of the support by the positioning arms 13 and then the treadle is depressed. The first part of the downward movement of the treadle is effective to cause the clamp to descend and press the inturned flange of the counter against the flat top of the counter support. It will be noted that the recess or passageway 22 is the clamp 17 is in register with the guideway in the support in which the carrier 71 is slidable and consequently that portions of the forward ends of the inturned flange of the counter are left free. During the latter part of the downward movement of the treadle the carrier 71 continues to rise with the result that the knife 73 snips the inturned flange at two opposite points to form tongues and then the expansible plunger pushes these tongues upwardly and presses them outwardly against the flaring walls of the recess 22 somewhat in the manner shown in Fig. 7.

Although the invention has been set forth as embodied in a particular machine, it should be understood that the invention is not limited in the scope of its application to the particular machine shown and described.

Having thus described my invention, what I claim as new and desire to secure by Letters Patent of the United States is:

1. A machine of the class described, having in combination, means for clamping the inturned flange of a counter in such manner as to leave a portion of the flange free, and means for bending the free portion upwardly and outwardly.

2. A machine of the class described, having in combination, means for clamping the inturned flange of a counter in such manner as to leave the forward portions of the flange free, and means for producing two transverse slits in said forward portions and for bending upwardly and outwardly the tongues thus produced.

3. A machine of the class described, having in combination, a support for a counter having an inturned flange, a clamp for pressing the flange against the support, there being in the clamp a recess having flaring sides, and an expansible plunger movable through the support into the recess.

4. A machine of the class described, having in combination, a support for a counter having an inturned flange, a clamp for pressing the flange against the support, there being in the clamp a recess having flaring sides, and a combined flange cutter and expansible plunger movable through the support into the recess.

5. A machine of the class described, having in combination, a support for a counter having an inturned flange, said support being provided with a guideway, a carrier slidably mounted in the guideway, spreaders movably mounted on the carrier, yielding means urging the spreaders apart, a clamp having a recess which registers with the guideway in the counter support, and means for producing relative movement of approach between the clamp and counter support and for thereafter producing relative movement of approach between the carrier and the clamp.

6. A machine of the class described, having in combination, a support for a counter having an inturned flange, said support being provided with a guideway, a carrier slidably mounted in the guideway, spreaders movably mounted on the carrier, yielding means urging the spreaders apart, a cutter also mounted on the carrier, a clamp having a recess which registers with the guideway in the counter support, and means for producing relative movement of approach between the clamp and counter support and for thereafter producing relative movement of approach between the carrier and the clamp.

7. A machine of the class described, having in combination, a support for a counter having an inturned flange, said support being provided with a guideway, an expansible plunger the parts of which are yieldingly held against the walls of the guideway, a clamp having a recess of greater width than that of the guideway, and means for producing relative movement of approach between the clamp and the support to grip the flange of the counter, and for causing the expansible plunger to bend upwardly two portions of the flange of the counter and press them against the walls of the recess in the clamp.

8. A machine of the class described, having in combination, a support for a counter having an inturned flange, a clamp located adjacent to the support and provided with a recess, a plunger mounted for reciprocation in the support, means for moving the clamp toward the support to grip the flange of the counter, and means for thereafter moving the plunger into the recess in the clamp to bend up a portion of said flange.

9. A machine of the class described, having in combination, a support for a counter having an inturned flange, a clamp located adjacent to the support and provided with a recess, a plunger mounted for reciprocation in the support, and treadle operated means including connections for causing relative movement of approach between the clamp and support to grip the flange of the counter and separate connections for thereafter moving the plunger into the recess in the clamp to bend up a portion of said flange.

10. A machine of the class described, having in combination, a support for a counter having an inturned flange, a clamp having a recess, yielding means for holding the clamp and support in spaced relation to permit a counter to be placed upon the support, a plunger and a cutter reciprocable in the support, and means for first moving the clamp into engagement with the flange of the counter and for thereafter operating the plunger and cutter to snip the flange of the counter and bend the forward ends thereof upwardly.

11. A machine of the class described, having in combination, a stationary support for a counter having an inturned flange, a clamp adapted to press the flange against the support, yielding means for holding the clamp spaced from the support, there being in the clamp and the support registering passages, a plunger mounted for reciprocation in the passage in the support, a rockshaft, and connections between the rockshaft and the clamp and plunger such that rocking the shaft first causes the flange of the counter to be engaged by the clamp and thereafter the plunger to be moved across the plane of the clamped flange.

12. A machine for operating on counters comprising, in combination, a foot treadle, means operated by said treadle to hold a counter, and means operated by the treadle to slit the flange of the counter so held and bend the ends of the flange to fit against the lip of an insole.

13. A machine for operating on counters comprising, in combination, a stationary counter support, a shaft, a clamp, connections from the shaft to operate the clamp to hold a counter on the support, flange-bending means, and separate connections from the shaft to operate the flange-bending means.

14. A machine for operating on counters comprising, in combination, a flange-snipping knife, flange-bending means, and means first to operate the knife to cut the flange and then to operate said means to bend the flange to fit parts of it to the lip of an insole.

15. In a machine for operating on counters having the usual inturned flanges for engagement with the insoles of shoes, means for clamping a counter in position to be operated upon, means for operating upon said flange to form a tongue, means for bending the tongue to form a lip and means cooperating with said bending means to determine the angle of bend to be imparted to the tongue.

In testimony whereof I have signed my name to this specification.

WILLIAM C. STEWART.